US 6,664,768 B2

(12) United States Patent
Naidu et al.

(10) Patent No.: US 6,664,768 B2
(45) Date of Patent: Dec. 16, 2003

(54) SYSTEM AND METHOD FOR CONTROLLING LOAD DUMP VOLTAGE OF A PERMANENT MAGNET (PM) ALTERNATOR

(75) Inventors: Malakondaiah Naidu, Troy, MI (US); Thomas Wolfgang Nehl, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 51 days.

(21) Appl. No.: 09/862,236

(22) Filed: May 21, 2001

(65) Prior Publication Data

US 2002/0171401 A1 Nov. 21, 2002

(51) Int. Cl.[7] .................................................. H02P 9/10
(52) U.S. Cl. .......................................... 322/29; 322/28
(58) Field of Search ........................ 322/29, 28; 363/89

(56) References Cited

U.S. PATENT DOCUMENTS

| | | | |
|---|---|---|---|
| 3,443,197 A | 5/1969 | Raver et al. .................. 321/18 |
| 4,701,690 A | * 10/1987 | Fernandez et al. ............ 322/28 |
| 4,827,393 A | 5/1989 | Clark ........................... 363/79 |
| 4,885,493 A | 12/1989 | Gokhale ...................... 310/190 |
| 4,927,393 A | * 5/1990 | Hayasaka .................... 440/112 |
| 4,959,577 A | 9/1990 | Radomski ................... 310/263 |
| 5,214,371 A | * 5/1993 | Naidu .......................... 322/29 |
| 5,383,038 A | * 1/1995 | Lawandy ....................... 359/7 |
| 5,510,696 A | 4/1996 | Naidu et al. .................. 322/29 |
| 5,629,606 A | * 5/1997 | Asada .......................... 322/28 |
| 5,719,484 A | * 2/1998 | Taniguchi et al. ............. 322/20 |
| 5,753,989 A | 5/1998 | Syverson et al. ........... 310/114 |
| 5,793,625 A | 8/1998 | Balogh ........................ 363/89 |
| 5,942,818 A | * 8/1999 | Satoh et al. .................. 310/46 |
| 6,181,111 B1 | * 1/2001 | Hoffman et al. .............. 322/28 |
| 6,346,797 B1 | * 2/2002 | Perreault et al. .............. 322/29 |
| 6,392,348 B1 | * 5/2002 | Dougherty ................... 315/82 |
| 6,433,519 B2 | * 8/2002 | Taniguchi et al. ............ 322/28 |

OTHER PUBLICATIONS

BOSCH Proposals, "42 V rectifiers with Voltage Transient Suppression," 58K8/ELH1–Sz 19.05.1999.

* cited by examiner

*Primary Examiner*—Nestor Ramirez
*Assistant Examiner*—Leda T. Pham
(74) *Attorney, Agent, or Firm*—Jimmy L. Funke

(57) ABSTRACT

An apparatus for controlling the load dump voltage of a permanent magnet (PM) alternator having a silicon controlled rectifier (SCR) bridge. The apparatus includes a voltage divider, a peak detector, and a comparator. The voltage divider attenuates the bridge output voltage, which is further fed through a peak detector to hold the peak value for improved stability. The comparator changes states when the bridge output exceeds a predetermined voltage level (e.g., 55 volts) that is less than the load dump threshold limit (e.g., 60 volts), but greater than the normal operating voltage (e.g., 42 volts). The comparator output change-in-state deactivates a gate pulse generator, thereby suppressing further operation of the SCR bridge. Voltage transients that may otherwise occur at the bridge output for the remainder portion of a half cycle from the PM alternator are clamped using a varistor or zener diode.

14 Claims, 3 Drawing Sheets

SYSTEM AND METHOD FOR CONTROLLING LOAD DUMP VOLTAGE OF A PERMANENT MAGNET (PM) ALTERNATOR

BACKGROUND OF THE INVENTION

1. Technical Field

This invention relates generally to power generation systems, and, more particularly, to a system and method for controlling load dump voltage of a permanent magnet alternator.

2. Description of the Related Art

Increasing electrical power demand in automotive vehicles has spurred investigation into high power, high efficiency power generation systems, inasmuch as conventional, so-called Lundell type alternators (claw-tooth pole, inductive type) have reached maximum capacity servicing present load demands. In response, it has been proposed in the automotive industry to adopt a high voltage power system to meet this increased power demand, as well as to reduce wiring harness cost and improve efficiency, among other things. In particular, a 42 volt standard has been proposed for both Europe and the United States. However, a problem arises with respect to load dump compliance for 42 volt alternators.

As background, a load dump condition is where the electrical load on the alternator, including the battery, goes instantly to zero, for example, via a broken or disconnected wire. A load dump test determines whether voltage transients output by the alternator under the conditions described above exceed a predetermined threshold. The predetermined threshold is selected to protect, for example, semiconductor devices that may draw power from the power system. Under the present standard, the load dump threshold is 60 volts.

In a conventional 42 volt Lundell type alternator, when the load dump condition occurs, avalanche diodes employed in a bridge portion thereof shorts the phase windings, thereby limiting the output voltage to the avalanche voltage limit of the diode. This limit is within the load dump threshold. However, high energy absorbing diodes are required, which may increase the cost of the system.

An attractive alternative for high power generation is a permanent magnet (PM) alternator, due to characteristics such as high power density, high efficiency and the like. In a conventional 42 volt PM alternator, the winding voltage output amplitude varies linearly with a rotational speed, and the average output voltage is controlled to 42 volts by means of, for example, a silicon controlled rectifier (SCR) bridge rectifier. However, the peak voltage, which is proportional to the speed, exceeds the present day 60 volt limit during a load dump condition.

Hoffman et al., U.S. Pat. No. 6,181,111, disclose an alternator for an automotive vehicle having a rotating permanent magnet (i.e., rotor) configured to induce a voltage in a stationary armature in which a three-phase winding is disposed. The winding is configured in a delta arrangement and is coupled to a bridge comprising six controlled rectifiers, an upper and lower rectifier for each phase. The rectifiers are disclosed as being a silicon controlled rectifiers (SCRs). Hoffman et al. further disclose that the alternator may be configured to produce a conventional output voltage of 14.5 volts. Hoffman et al. further disclose a relatively complex circuit for responding to a load dump condition. The complex circuit increases cost and may limit its usefulness in large scale production. Moreover, Hoffman et al. recognize that a high transient voltage may nonetheless exist for one alternation, notwithstanding the presence of the above complex circuit, and therefore provide for a metal oxide varistor (MOV) across the alternator output terminals as a limiting device. Applicants believe that such a device would have to be selected to dissipate a large amount of power and accordingly would be of increased cost, which is undesirable.

There is therefore a need for an improved power generation system that minimizes or eliminates one or more of the problems as set forth above.

SUMMARY OF THE INVENTION

One object of the present invention is to solve one or more of the problems set forth in the Background. A system in accordance with the present invention exhibits a reduced cost relative to conventional systems for power generation, and is effective in controlling load dump voltage transients so as to not exceed predetermined thresholds.

A power generation system according to the invention includes a permanent magnet (PM) alternator, a bridge, a controller, and a suppression device. The PM alternator includes a multi-phase stator winding that provides a full wave output. The bridge is coupled to the stator winding output and includes controllable rectifiers responsive to conduction control signals. The bridge further includes a rectified output configured to be coupled to a battery and various electrical loads. The controller is configured to generate the conduction control signals and is operable to control the bridge output to a first predetermined voltage corresponding to an operating voltage. In one embodiment, the operating voltage is nominally 42 volts. The suppression device is configured to suppress the conduction control signals when the bridge output exceeds a second predetermined voltage (e.g., 55 volts in one embodiment) greater than the first predetermined voltage. The second predetermined voltage is selected to be less than the load dump threshold limit.

In a preferred embodiment, the controllable rectifiers comprise silicon controlled rectifiers (SCR), the conduction control signals comprise gate pulses destined for the gate terminals of the SCRs, and the suppression device includes a divider network, a peak detector, and a comparator. The divider network is coupled to the bridge output for attenuation and for generating a scaled voltage. The peak detector is responsive to the scaled voltage and is coupled to a first input terminal of the comparator. The comparator has a reference voltage coupled to a second input terminal thereof, and has an output terminal producing a gate enable signal that changes logic state when the scaled voltage exceeds the reference voltage. The change in state causes the controller to discontinue generation of the gate pulse signals. A relatively low-power and therefor low cost varistor or zener diode is coupled across the bridge output.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
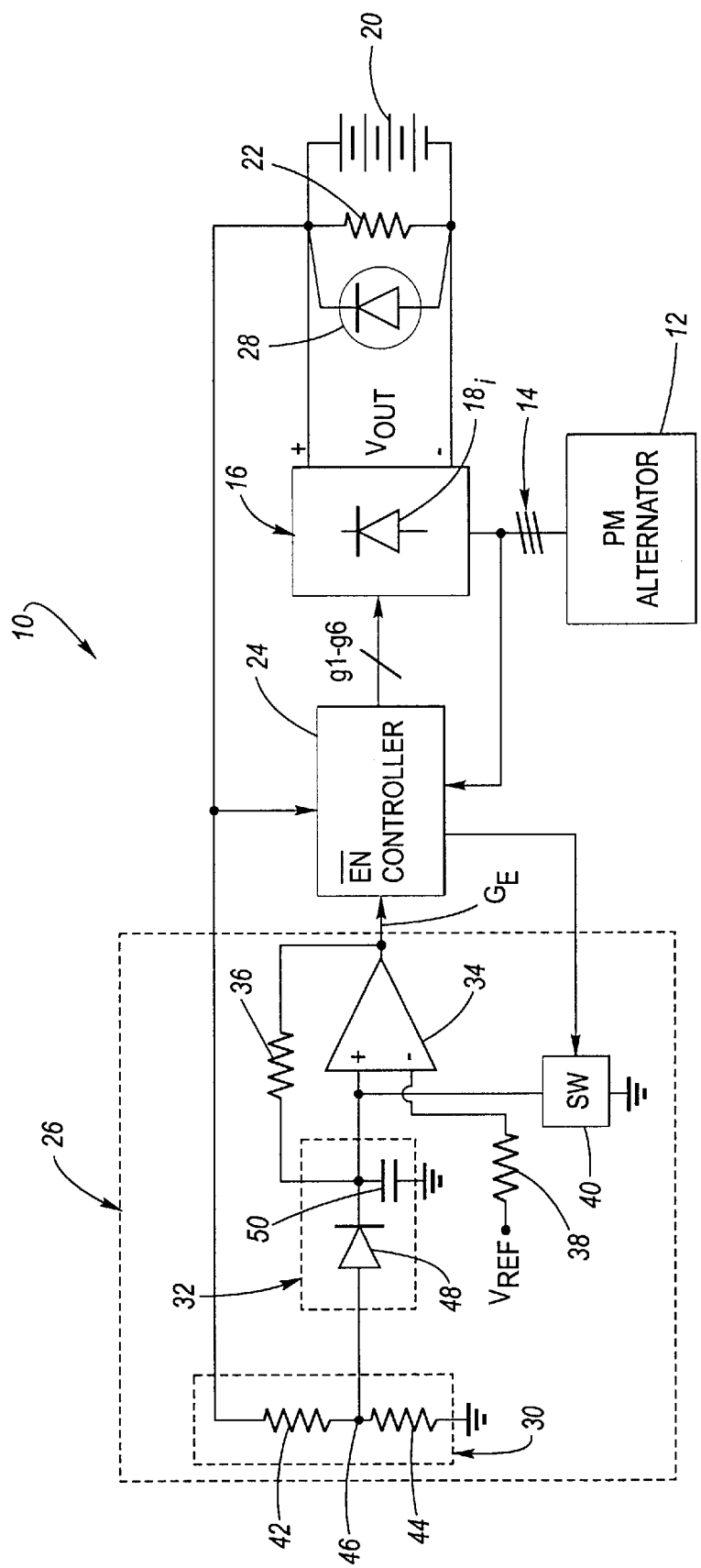
FIG. 1 is a simplified schematic and block diagram view of a power generation system according to the invention.

Referring now to the drawings wherein like reference numerals are used to identified identical components in the various views, FIG. 1 is a schematic and block diagram view of a power generation system 10 in accordance with the invention. The power generation system 10 is adapted for use in automotive vehicles. FIG. 1 further illustrates a permanent magnet (PM) alternator 12 including a multiphase stator winding output 14, a bridge 16 including a plurality of controllable rectifiers designated $18_i$, a battery 20, one or more electrical loads 22, a controller 24, a circuit or device 26, and a transient voltage limiting device such as a varistor 28.

PM alternator 12 has a rotor (not shown) that is driven at a variable speed by an engine on a motor vehicle (also not shown). The rotor has permanent magnets and as it rotates, an alternating voltage is induced or generated in the output winding 14. The frequency of the alternating voltage generated in winding 14 is directly proportional to the speed of rotation of the rotor. Furthermore, the magnitude or amplitude of this voltage is also a function of rotor speed. That is, as the rotor speed increases so too does the amplitude of the voltage. A wide variety of configurations are known to those of ordinary skill in the art for a PM alternator, for example, such as disclosed in U.S. Pat. No. 5,510,696 issued to Naidu et al., herein incorporated by reference for such purpose. In the illustrated embodiment, output winding 14 is configured as a three-phase winding and is characterized by the generation of a plurality of alternating full cycles per phase.

Bridge 16 functions as a three-phase full-wave bridge rectifier that comprises six controlled rectifiers, which may be silicon controlled rectifiers (SCRs), an upper and lower SCR for each phase. The lower SCR has an anode connected to ground, and a cathode connected to a common node to which the anode of the upper SCR is connected. The cathode terminal of the upper SCR is connected to the bridge output. This arrangement is repeated for each phase. Each SCR further includes a gate terminal responsive to respective conduction control signals, hereinafter referred to as gate pulses g1–g6. Bridge 16 may thus comprise conventional components known to those of ordinary skill in the art, for example, as disclosed in exemplary fashion in U.S. Pat. No. 5,214,371 issued to Naidu, hereby incorporated by reference for such purpose. Bridge 16 includes a rectified output $V_{OUT}$ configured to be coupled to battery 20 as well as one or more electrical loads 22.

Controller 24 includes, among other things, a gate pulse generator configured to generate the gate pulse signals g1–g6 in such a fashion so as to control the bridge output, $V_{OUT}$, to a first predetermined voltage corresponding to an operating voltage. The operating voltage may be nominally about 42 volts, in one embodiment. Controller 24 is further configured to have an enable input, illustrated as being active low, for controlling generation of the gate pulse signals g1–g6. In particular, when a gate enable signal $G_E$ to the enable terminal $\overline{EN}$ is a logic low, as illustrated, controller 24 generates gate pulse signals g1–g6 in a manner described above in order to obtain a regulated, operating voltage from bridge 16. When the gate enable signal $G_E$ to the enable terminal $\overline{EN}$ is a logic high, as illustrated, however, controller 24 discontinues generation of the gate pulses g1–g6, thereby deactivating SCRs $18_i$.

With continued reference to FIG. 1, device 26 is configured to suppress generation of the conduction control signals when the bridge output $V_{OUT}$ exceeds a second predetermined voltage that is greater than the first predetermined voltage. In a constructed embodiment, the first predetermined voltage (i.e., the operating voltage) is approximately 42 volts, and the second predetermined voltage is approximately 55 volts, a level selected to be below the low dump voltage threshold for the protection of semiconductor devices (e.g., 60 volts). Device 26 includes a divider network 30, a peak detector 32, a comparator 34, resistive elements 36 and 38, and a controllable discharge switch 40.

Divider network 30 includes, in the illustrated embodiment, a first resistive element 42, a second resistive element 44 coupled between the bridge output $V_{OUT}$ and a ground node, and a common node 46 therebetween. The divider network 30 is configured to attenuate the bridge output $V_{OUT}$ and provide a scaled voltage on the common node 46. The resistive elements 42 and 44 are selected such that when the output voltage, in the described embodiment, is about equal to the second predetermined voltage (i.e., 55 volts), then the scaled voltage connected to the noninverting input terminal of comparator 34 via peak detector 32 is the same as a preselected reference voltage, $V_{REF}$ connected to the inverting input terminal of comparator 34.

Peak detector 32 may comprise a diode 48, and a capacitor 50, and is used to hold the peak value of the scaled voltage that is output from network 30 so that the output of comparator 34 is stable (i.e., so that the controller 24 does not hunt due to discontinuous output voltage of comparator 34 under light load conditions). In the described embodiment, $V_{REF}$ is approximately 12 volts.

Comparator 34 is configured to determine when the bridge output $V_{OUT}$ exceeds the second predetermined voltage described above (e.g., 55 volts). Comparator 34 generates a gate pulse enable signal $G_E$ or an output terminal thereof that is provided to controller 24.

Figure 2A:
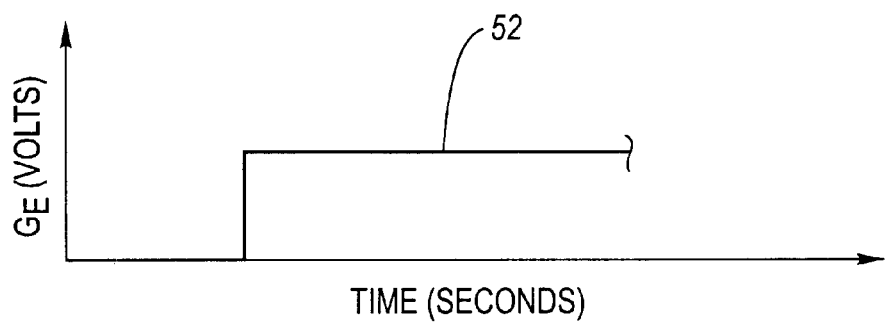
FIGS. 2A–2B are timing diagrams illustrating the change in state of an enable signal, and a voltage output of an embodiment of the invention, respectively.

Power generation system 10, under normal conditions, operates as follows. The scaled voltage appearing on node 46, and that is applied to the non-inverting input via peak detector 32, is less than the reference voltage $V_{REF}$, and therefore the gate enable signal that is output from comparator 34 is low. This condition is shown in FIG. 2A as the first portion of trace 52 nearest the origin. This condition obtains because the nominal operating voltage of 42 volts is less than the trigger voltage of 55 volts.

Figure 2B:
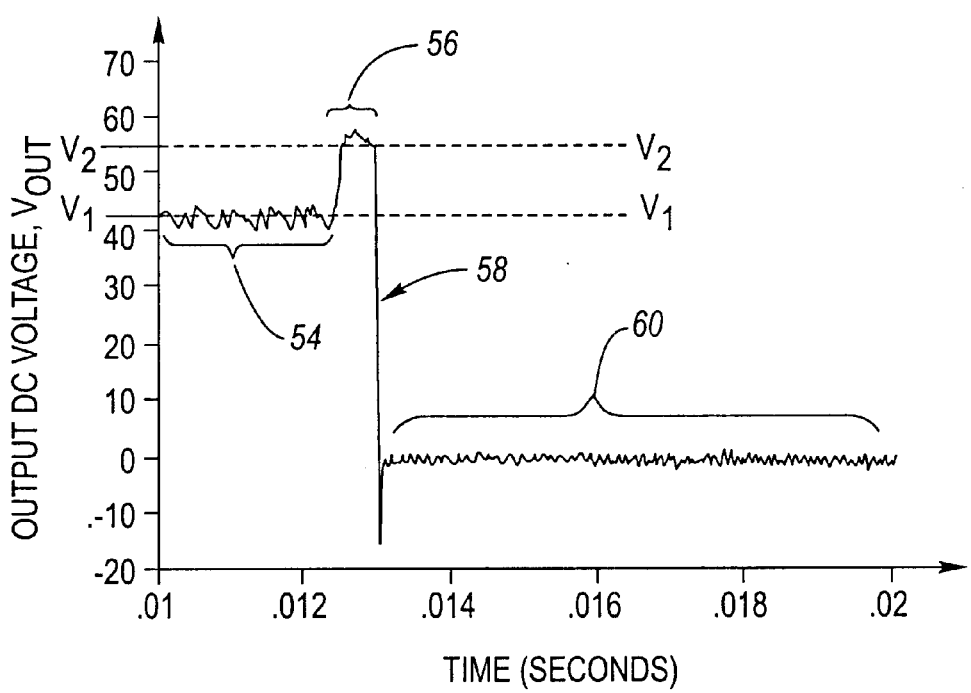

As shown in FIG. 2B, the bridge output voltage $V_{OUT}$ is controlled during this time to the first predetermined voltage, designated $V_1$ which may be about 42 volts. This is designated as region 54.

Under a load dump condition, where, for example, battery 20 is disconnected from the output of bridge 16, the bridge output voltage $V_{OUT}$ exceeds the second predetermined voltage $V_2$ (e.g., 55 volts). This condition in turn causes the scaled voltage appearing on node 46, which is applied to the non-inverting input via peak detector 32, to exceed the reference voltage $V_{REF}$. The gate enable signal $G_E$ output from comparator 34 goes high, as shown in FIG. 2A. This high logic signal disables or otherwise deactivates the gate pulse generator portion of controller 24, thereby discontinuing the generation of the gate pulses g1–g6.

However, since in the illustrative embodiment bridge 16 is composed of SCRs, which are current controlled devices, such devices turn off only when the current therethrough goes to zero after the gate pulse is removed. This situation means that the SCRs can continue to conduct and therefore output a voltage spike for a maximum period of a half cycle of the fundamental frequency. This spike, however, is clamped to below the low dump threshold (e.g., 60 volts) by connecting varistor 28 (e.g. a 56 volt rating) across the bridge 16 output, as shown in FIG. 1. Since the time duration of the voltage spike is very small, a low energy absorption varistor, or, in an alternative embodiment, a low power rated zener diode, can be used in order to obtain a reduced cost implementation.

With continued reference to FIG. 2B, region 56 represents the voltage spike limiting effect of varistor 28. The transition of the bridge output voltage, along portion 58, to a substantially zero output for the duration of region 60, reflects the fact that no further gate pulses g1–g6 are allowed to be applied to enable conduction of the SCRs in bridge 16.

Operation of power generation system 10 can be restarted in one embodiment by discharging capacitor 50, for example, by means of a switch 40, as shown in exemplary fashion in FIG. 1. Alternatively, a power supply to controller 24 may be reset as well.

EXAMPLE

The trace shown in FIG. 2B illustrates the response of a system according to the invention to a low dump test. The setup included a 42 volt PM alternator (with an SCR bridge rectifier) operating at 6500 RPM with a battery under discharge condition with 80 amperes load current (75 amperes battery current and 5 amperes other loads). The measured, maximum load dump voltage reached 57.2 volts, which is below the 60 volt dump threshold.

Figure 3:
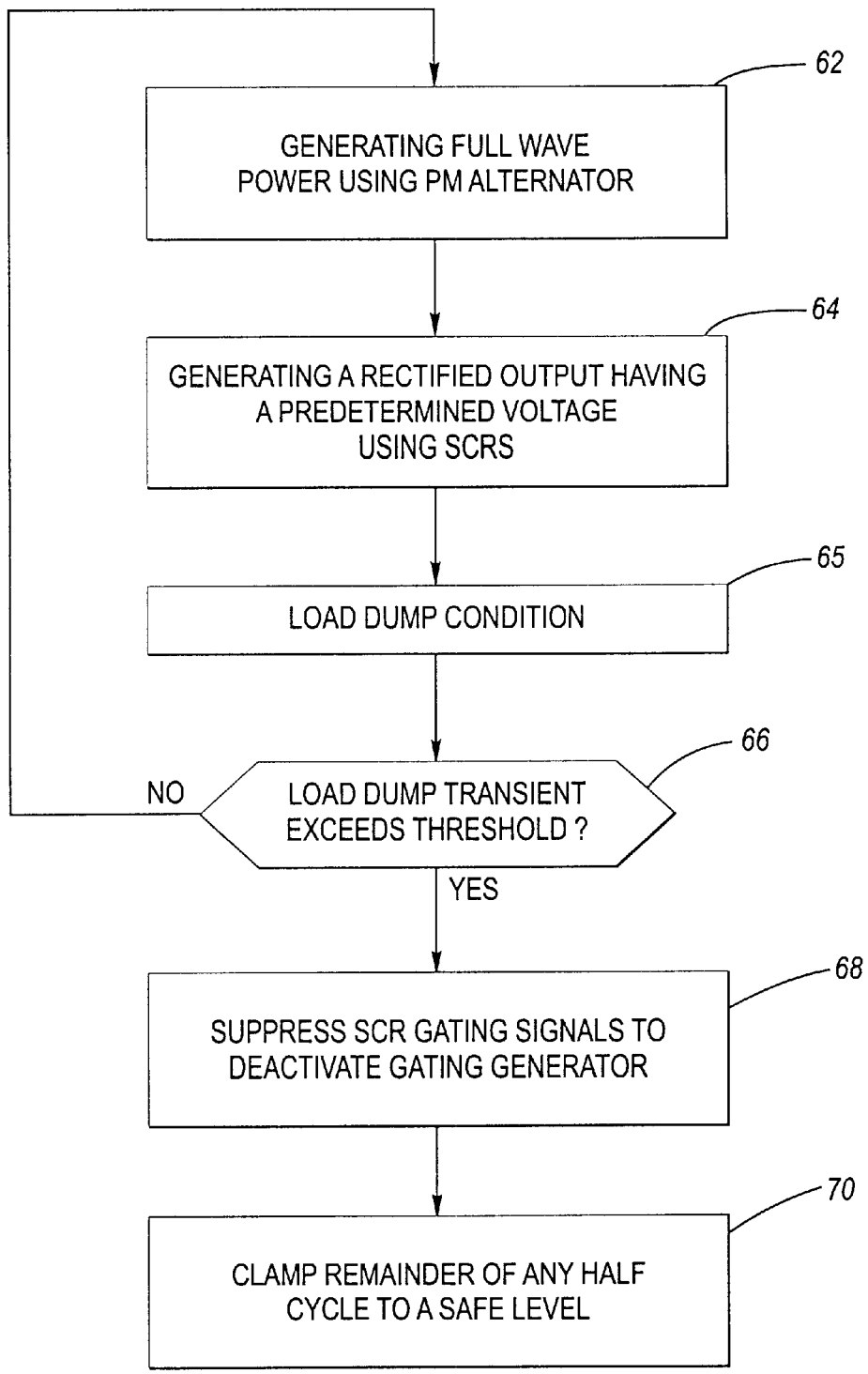
FIG. 3 is a simplified flow chart showing basic steps of a method according to the invention.

FIG. 3 illustrates a method according to the invention. Step 62 involves generating full wave power using a PM alternator, while step 64 involves generating a rectified output having a predetermined voltage using SCRs. Step 62 and 64 correspond to normal operation described above and as shown by region 54 of FIG. 2B.

In step 65, a load dump condition is created, either through a broken or disconnected wire or the like to the battery, significant loads, etc.

In step 66, a check is made to determine whether the resulting transient voltage exceeds a load dump threshold limit. If the answer is "NO," then normal operation continues. However, if the transient exceeds the load dump threshold (i.e., the answer is "YES"), then the method branches to step 68.

In step 68, the method involves suppressing the SCR gating signals by deactivating the gating signal generator that is a part of controller 24. The process then proceeds to step 70.

In step 70, the method involves clamping the remainder of any half cycle to a safe voltage level. For example, step 70 may involve the use of varistor 28, and which corresponds to region 56 in FIG. 2B.

In an alternate embodiment, the power generation system 10 is configured for operation in the generation of a relatively low voltage (e.g., 14 volt) using a PM alternator 12.

A power generation system according to the invention provides a low cost implementation for limiting load dump voltage transients to a safe level when a PM alternator is used.

What is claimed is:

1. A power generation system comprising:
a permanent magnet (PM) alternator including a multi-phase stator winding output;
a bridge coupled to said stator winding output and including controllable rectifiers responsive to conduction control signals, said bridge having an output configured to be coupled to a battery and a load;
a controller configured to generate said conduction control signals operable to control said bridge output to a first predetermined voltage corresponding to an operating voltage;
a device configured to suppress said conduction control signals when said bridge output exceeds a second predetermined voltage greater than said first predetermined voltage.

2. The system of claim 1 further including one of a zener diode and a varistor coupled to said bridge output.

3. The system of claim 2 wherein said stator winding output is a three-phase stator winding.

4. The system of claim 2 wherein said controllable rectifiers comprise silicon controlled rectifiers (SCR).

5. The system of claim 4 wherein conduction control signals comprise gate pulses for respective gate terminals of said SCRs.

6. The system of claim 2 wherein said first predetermined voltage is about 42 volts.

7. The system of claim 2 wherein said system is configured for use in an automotive vehicle and said second predetermined voltage corresponds to a maximum voltage permitted under a load dump condition.

8. The system of claim 7 wherein said load dump condition occurs when the battery is disconnected from said bridge output.

9. The system of claim 2 wherein said device comprises:
a comparator configured to determine when said bridge output exceeds said second predetermined voltage.

10. The system of claim 9 wherein said device further includes:
a divider network coupled to said bridge output for generating a scaled voltage;
a peak detector responsive to said scaled voltage and coupled to a first terminal of said comparator;
said comparator having a reference voltage coupled to a second terminal thereof, said comparator further having an output that changes logic state when said scaled voltage exceeds said reference voltage.

11. The system of claim 10 wherein divider network comprises first and second resistive elements connected in series between said bridge output and a ground node, said network having a common node on which said scaled voltage is generated.

12. The system of claim 11 wherein peak detector comprises a diode having an anode and a cathode, and a capacitor, said anode being coupled to said common node and said cathode being coupled to said first terminal of said comparator, said capacitor being coupled between said first terminal of said comparator and said ground node.

13. The system of claim 2 wherein said multi-phase stator winding output is characterized by a plurality of alternating full cycles per phase, and wherein said one of said zener diode and said varistor has a power dissipation rating selected as a function of the power dissipated in a remainder portion of a cycle after a time when said bridge output exceeds said second predetermined voltage.

14. A power generation system for an automotive vehicle comprising:
a permanent magnet (PM) alternator including a multi-phase stator winding output;
a bridge coupled to said stator winding and including controllable rectifiers responsive to conduction control signals, said bridge having an output configured to be coupled to a battery and a load;

a controller configured to generate said conduction control signals operable to control said bridge output to a first predetermined voltage corresponding to an operating voltage;

a device configured to suppress said conduction control signals when said bridge output exceeds a second predetermined voltage greater than said first predetermined voltage, said device comprising
- a divider network coupled to said bridge output for generating a scaled voltage;
- a peak detector coupled to receive said scaled voltage;
- a comparator configured to determine when said bridge output exceeds said second predetermined voltage, said comparator having a first terminal coupled to said peak detector, said comparator further having a reference voltage coupled to a second terminal thereof, said comparator further having an output that changes logic state when said scaled voltage exceeds said reference voltage.

* * * * *